Patented Oct. 27, 1925.

1,558,890

UNITED STATES PATENT OFFICE.

GEORG KALISCHER, OF MAINKUR, NEAR FRANKFORT-ON-THE-MAIN, AND KARL KELLER, OF FRANKFORT-ON-THE-MAIN, GERMANY, ASSIGNORS TO LEOPOLD CASSELLA & CO., GESELLSCHAFT MIT BESCHRÄNKTER HAFTUNG, A CORPORATION OF GERMANY.

PROCESS FOR THE PRODUCTION OF NEW AZO DYESTUFFS INSOLUBLE IN WATER.

No Drawing.  Application filed March 24, 1925. Serial No. 18,054.

*To all whom it may concern:*

Be it known that we, GEORG KALISCHER, a citizen of the German Republic, residing at Mainkur, near Frankfort-on-the-Main, Germany, and KARL KELLER, a citizen of the German Republic, residing at Frankfort-on-the-Main, Germany, have invented a Process for the Production of New Azo Dyestuffs Insoluble in Water, which may be obtained by combining any diazo compound with a derivative of the arylides of 2.3-hydroxynaphthoic acid, having the general formula:

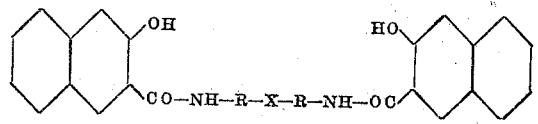

wherein R means an aryl residue, X an azo group

—N=N— or an azoxy group

The new dyestuffs having probably the general formula:

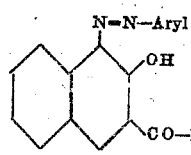 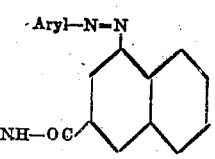

wherein R means an aryl residue, X an azo group

—N=N— or an azoxy group

—N——N—,
  \\O/ are, when dry, orange to black powders, dissolving in sulfuric acid with a green to violet color and yielding upon reduction with stannous chloride two molecules of an aromatic amine and of an aminoarylide of 1-amino-2-hydroxy-naphthalene-3-carboxylic acid of the general formula:

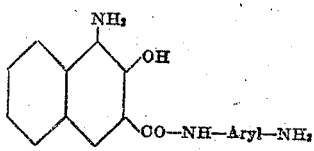

The process of producing the final dyestuffs may be carried out in an excellent way on the fibre, owing to the fact that the arylides containing the azo or azoxy group according to the above described formula show a pronounced affinity to the cotton fibre in an alkaline bath. The dyeings thus produced show yellow to orange shades and are of no value as such. If, however, developed with a suitable diazo compound red, claret, blue and black shades of remarkable intensity and fastness are obtained.

The azo and azoxy derivatives suitable for the new process may be obtained either by condensing the chloride of 2.3 hydroxynaphthoic acid or its O-acyl derivatives with aromatic diamino-azoxy- or azo compounds and saponifying subsequently the acyl group when using an O-acyl derivative, or by allowing reducing agents in an alkaline solution to act on nitroarylides of 2.3 hydroxynaphthoic acid.

The invention is illustrated by the following example:

*Example.*

0.4 parts of the product, obtained by reducing in alkaline solution meta-nitro-ortho-toluidide of 2.3-hydroxynaphthoic acid, of the formula:

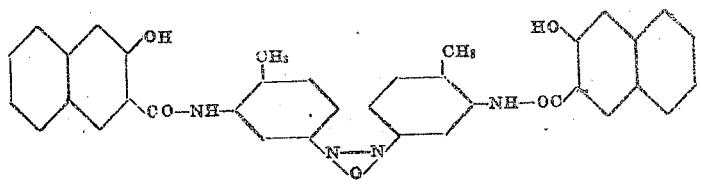

are dissolved with 0.8 part of caustic soda solution of 40° Bé. in hot water by adding a little Turkey-red oil. Into the boiling solution, made up with hot water to about 200 parts, 10 parts of well wetted cotton are entered and dyed for about an hour in the cooling bath. It is then rinsed with cold water and whizzed. The subsequent development takes place in the usual manner with a diazo solution of meta-nitroparatoluidine, yielding on the fibre an azo dyestuff of the following formula:

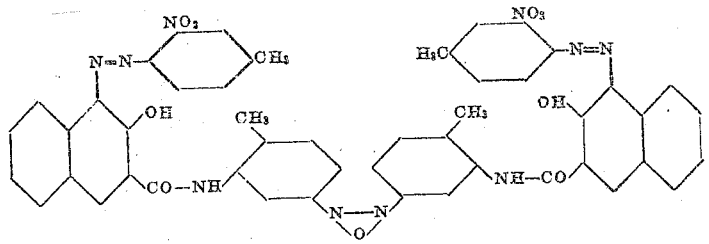

A clear bluish Turkey-red of excellent fastness is obtained. Especially the fastness to rubbing and washing is remarkable. By using other diazocompounds for developing, other shades of the same fastness are obtained.

By replacing the derivative, used in the example, by its isomers or such, which are either not substituted in the aryl residue or substituted by other groups such as chlorine, $OCH_3$ and so on, dyeings are obtained of the same fastness, distinguished substantially only by a greater or smaller difference of shade from those, obtained according to the example. In this manner for instance, by using the product of reduction of the meta-nitranilide of 2.3-hydroxynaphthoic acid and diazotized metanitraniline, a yellowish orange, by using diazotized para-nitro-ortho-toluidine a bluish red, by using aminoazo-toluene a claret, by using tetrazotized o-o-dianisidine a blue dyeing results, the dyestuff formed on the fibre having probably the following formula:

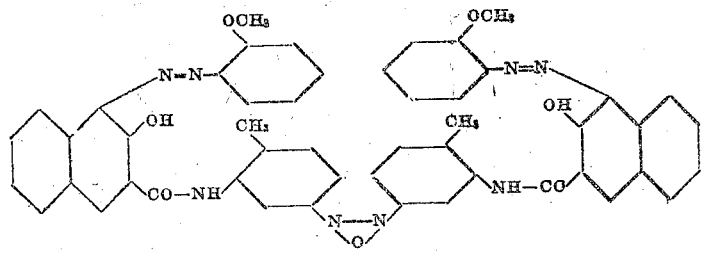

By using the product of reduction of the para-nitranilide of 2.3 hydroxynaphthoic acid similar shades are obtained.

Having now particularly described and ascertained the nature of our said invention and in what manner the same is to be performed, we declare, that what we claim is:

1. As new compounds the azo dyestuffs, insoluble in water, having probably the general formula:

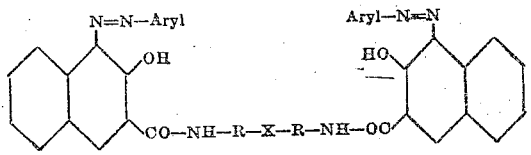

wherein R means an aryl residue, X an azo group $-N=N-$
or an azoxy group , which when dry are orange to black powders, dissolving in sulfuric acid with a green to violet color and yielding upon reduction with stannous chloride two molecules of an aromatic amine and an aminoarylide of 1-amino-2 hydroxynaphthalene-3-carboxylic acid of the general formula:

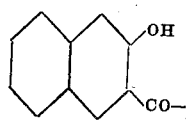

wherein R means an aryl residue, X an azo group $-N=N-$
or an azoxy group 

3. Materials dyed with the new azo dyestuffs of claim 1, said dyestuffs being developed on the fibre of the material.

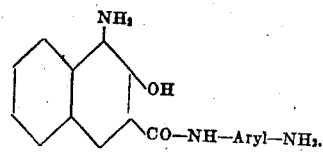

2. A process of making new azo dyestuffs, insoluble in water, consisting in combining any diazo compound with a derivative of the arylides of 2.3-hydroxynaphthoic acid, having the general formula;

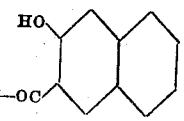

In witness whereof they have hereunto signed their names this eleventh day of March, 1925.

GEORG KALISCHER.
KARL KELLER.